2,767,342

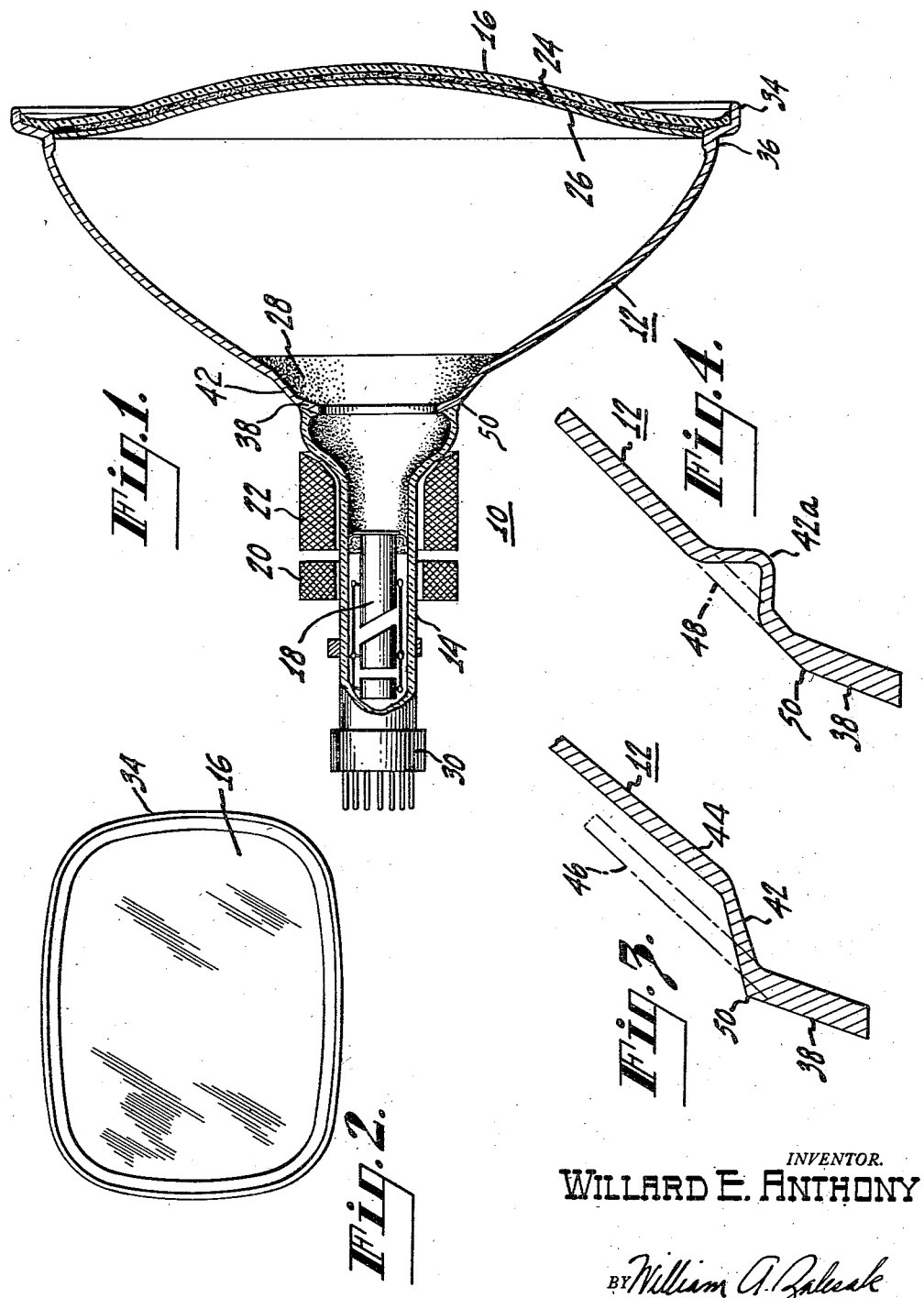

COMPOSITE GLASS AND METAL CATHODE-RAY TUBE

Willard E. Anthony, Lancaster, Pa., assignor to Radio Corporation of America, a corporation of Delaware Application December 4, 1952, Serial No. 324,091

9 Claims. (Cl. 313—64)

This invention relates to improvements in cathode ray tubes having composite glass and metal envelopes.

The principles of the invention are applicable to cathode ray tube bulbs which comprise a tubular metal shell which is somewhat in the form of a frustum of a cone or of a four sided pyramid. The frustum has a large and a small open end, a glass face plate being sealed to the large open end or base of the frustum, and a glass neck portion being sealed to the small open end on top of the frustum.

A cathode ray tube formed by sealing a glass face plate to a frusto-pyramidal metal shell as described is subject, when evacuated, to large forces on the metal shell itself, on the glass face plate, at the seal area between the shell and the face plate, and at the seal area between the shell and the glass neck portion. The most troublesome forces are those present in the seal areas because they are the predominant causes of seal failure.

The above problems have been solved for so-called rectangular or frusto-pyramidal cathode ray tubes or kinescopes having face-plate diagonal dimensions of the order of 17 or 21 inches. Metal shells for such tube envelopes are described and claimed in Turnbull and Anthony's co-pending application, Serial No. 280,784, filed April 5, 1952, and assigned to the same assignee as the instant case.

However, the present trend is towards kinescopes having still larger viewing screens in the order of 27 inches or more. Besides being highly desirable, for reasons of economy in cabinet cost and in the cost of making the kinescope envelope, it is particularly desirable that the volume of the envelope be increased as little as possible in order to achieve the wanted large area viewing screen. Also it is necessary to restrict the length of the larger tubes to substantially the length of present smaller tubes, in order to keep cabinet sizes to practical dimensions.

The expedient of increasing the electron beam deflection angle from 70° to 90° allows a minimum length of tube with maximum screen area, but, because the metal shell is usually produced by a metal spinning process, the thickness of the walls near the neck seal flange is also increased. The increased wall thickness plus the shorter length of the tube requires that the shell be drawn with its rectangular shape extending almost to the neck seal flange. This results in non-uniform strain being applied to the neck seal during manufacture and processing of the kinescope. In many cases, cracking or stripping of the neck seal results.

It is, accordingly, a principal object of the present invention to provide an improved glass and metal cathode ray tube having a large area viewing screen.

Another object of this invention is to provide an improved glass and metal cathode ray tube having a viewing screen which is large in area in proportion to the volume enclosed by the tube envelope.

A further object of this invention is to provide a composite glass and metal cathode ray tube in which the glass neck-to-metal shell hermetic seal is not subject to glass failure under normal conditions of processing or use.

Still another object of this invention is to provide an improved composite metal and glass cathode ray tube of large size having glass and metal envelope structures sealed together to provide maximum strength consistent with economical use of materials.

In general, the above and related objects of the present invention are achieved in a composite metal and glass cathode ray tube by thinning the wall of the metal shell adjacent to the neck seal area in order to isolate the seal area from the excessive strain caused by movement of the relatively heavy walls of the metal shell during and after manufacture of the tube.

The invention will be more readily understood by referring to the following description taken in connection with the accompanying drawings, in which:

Fig. 1 is a sectional view of a cathode ray tube incorporating the present invention;

Fig. 2 is an end view of the tube of Fig. 1;

Fig. 3 is a fragmentary view of the tube of Fig. 1, and

Fig. 4 is a similar fragmentary view of the tube of Fig. 1.

Referring now to Figs. 1 and 2, cathode ray tube 10 comprises an envelope which includes metal shell portion 12 which is generally in the shape of a four sided pyramidal frustum, a glass neck portion 14 sealed to the top of the frustum, and a glass face plate 16 sealed to the base of the frustum. Situated within the glass neck portion 14 is an electron gun 18 which may include an ion trap, and operates in a well known manner, in conjunction with focusing means illustrated by the coil 20, and deflection means, illustrated by the coil 22, to produce an electron beam which scans a raster on the fluorescent phosphor screen 24 on the face plate 16. An ion trap magnet 18a may be attached to the neck 14. The side of the phosphor screen 24 facing the electron gun is provided with an aluminized surface 26. A conductive coating 28 such as aquadag, for example, extends along the neck 14 of the tube 10 from a point adjacent to the electron gun 18 into the conductive metal shell 12, said conductive coating 28 being conductively connected to a point on the electron gun 18 which is at a high potential. Electrical leads for supplying the potentials necessary to operate the electron gun are brought out through the base 30 of the tube to the individual prongs 32 thereof.

The face plate 16, which is illustrated as being a portion of a surface of a sphere, is sealed to a generally rectangular sealing flange 34 of the metal shell 12 in a well known manner, as for example, is disclosed in the co-pending application of H. R. Seelen, Serial No. 212,546, filed February 24, 1951. The metal shell 12 is provided with a reinforcing band 36 (as disclosed in R. D. Faulkner's co-pending application Serial No. 120,400, filed October 8, 1949, now U. S. Patent 2,682,963) adjacent to the sealing flange 34 in order to reduce radial strain on the face plate seal. Both the Seelen and Faulkner co-pending applications are assigned to the same assignee as the instant case. The flared glass neck portion 14 is sealed to the metal shell 12 along the sealing flange 38, which is substantially annular in shape, by a butt seal.

The metal shell portion 12, which is made by a metal spinning process, has relatively thick walls near the neck sealing flange 38 as compared with the wall thickness adjacent to the face plate sealing flange 34.

Metal shell 12 is made by first spinning a sheet-like metal blank to a bowl shape, then placing the spun shell over a form and applying pressure to draw the "bowl" into the desired frusto-pyramidal shape and form the face plate sealing flange 34.

As an illustration, a flat plate metal blank is placed adjacent to a bowl-shaped form, and rotated. A spinning tool is applied to the blank, under pressure, and the blank is "spun" to assume the shape of the form. In metal spinning the wall thickness at any point is approximately equal to the sine of the acute angle the wall makes with a line parallel to the longitudinal axis of the object, times the thickness of the metal blank. Thus, a metal kinescope shell of large diameter in relation to its length has relatively thicker walls adjacent to the neck seal flange than at the wider flared portion of the "bowl" because the base of the "bowl" makes a larger acute angle with a line drawn parallel to the longitudinal axis of the shell 12. A more complete description of spinning and drawing of metal cones may be found in R. D. Faulkner's co-pending application Serial No. 120,400, filed October 8, 1949, now U. S. Patent 2,682,963.

The increased wall thickness near the neck sealing flange 38 results in the transferring to the neck seal area of strains which appear during the sealing and exhausting of the tube. Further, because the walls of the metal shell 12 are not conical, the strains transferred to the seal area are not uniformly distributed. The result is cracking or stripping.

In accordance with the present invention, and as illustrated on an enlarged scale in Figure 3, the wall of the metal shell portion 12 has a portion 42 which is thinner than the wall portion immediately adjacent to the neck seal flange 38 or the flared portion of the metal shell 12. The thinner wall portion 42, being structurally weaker than the wall on either side of it, serves to isolate from the neck sealing flange 38 strains which appear in the thicker portion 44 of the wall of the shell 12 during manufacture and processing of the tube, since movement of the walls due to strains will take place at the relatively weaker thinned portion 32 rather than at the neck flange 38.

In Figure 3, the thin portion 42 is shown as being produced by spinning of a conical band portion into the wall of the metal shell 12. Since, as previously explained, the thickness of the wall of a spun cone or shell at a given point is roughly proportional to the sine of the included angle the wall makes with the longitudinal axis of the cone or shell, the wall thickness of the thin conical band 42 will inherently be thinner than the thicker wall portion on either side because of the smaller included angle (as defined above) made by the conical band portion 42 with reference to the longitudinal axis of the shell 12.

In addition, the shape of the thin conical band portion 42 inherently tends to cause any strains on the band to be more uniformly distributed towards the neck flange 38, further lessening the danger of neck seal failure. In Figure 3 the wall portion 46, indicated in phantom, illustrates the "normal" angle the wall portion of the shell 12 would follow if the thinned portion 42 were not present. The phantom lines emphasize the change in wall angle which causes the conical band portion 42 to become thinned during the spinning process. The thinned portion 42 may be spun into a cone or shell which follows the "normal" wall angle, and then re-spun to produce the thinned portion 42, or the entire cone, including the thinned portion, may be produced in one continuous spinning operation.

As a specific example, the thickness of the blank used in forming metal shell 12 is 125 mils. The thin conical band portion 42 may be, as a practical range, from 50 to 80 mils thick, the wall thickness of contiguous portions being approximately 110 mils. The conical band portion 42 may be made thinner, but in that case the conical band 42 might extend inwardly enough to interfere with the deflection of the electron beam. In order to minimize the thinning required in portion 42, the thin conical band 42 is adjacent to the neck seal flange 38. This arrangement of a thin conical band portion 42 at the neck seal flange 38 contributes to the protection of the neck seal from excessive strain. The sharp corner 50 has the advantage of strengthening the flange 38 so that the flange has less tendency to distort its shape under stress. The width of the conical band 42 is usually, as a practical matter, ⅜ to ¾ inch in length. If the width were wider, interference with the electron beam scanning pattern might take place.

Figure 4 illustrates an alternative way to produce a thinned wall portion 42a. In this case a cone or shell 12 having a "normal" wall angle, as defined in connection with the description of Figure 3, would be spun. The shell 12 would then be rigidly held on each side of the portion 42a and the thinning done by pressing and stretching the metal in the wall area 48, as indicated in phantom, to produce the thinned stepped portion 42a.

In the event spinning the conical band to produce a thinned portion 42 having a thickness of 50 mils would make the thin conical band 42 long enough to interfere with the deflection of the electron beam, the band 42 may be spun to produce a wall thickness of perhaps 80 mils and then be drawn, as in Fig. 4, to a thickness of 50 mils.

Thus, the use of the present invention in rectangular kinescopes having large face plate areas allows the metal shell 12 of the envelope to be small in length and total enclosed volume, as compared to prior art metal rectangular kinescopes, and allows it to be made by a relatively simple process, thereby making the shell economical to manufacture. By isolating the strains inherent in such a metal shell construction, the hermetic seal between the glass neck portion of the envelope and the metal shell is not subject to cracking or stripping.

What is claimed is:

1. A cathode ray tube envelope structure comprising a tubular metal shell, said shell including a main body portion having a large open end and a smaller open end, said smaller open end having a sealing flange adapted to be hermetically sealed to a glass envelope member, and an annular strain isolating portion integral with and forming a connecting portion between said main body portion and said sealing flange, said strain isolating portion having a reduced cross-sectional thickness relative to said main body portion and said sealing flange.

2. A cathode ray tube envelope comprising a metal shell generally in the shape of a four sided pyramidal frustum, said frustum including a main body portion, a base, and a top, said base and top of said frustum being open, said top having a sealing flange, and an endless strain isolating portion integral with and forming a connecting portion between said main body portion and said sealing flange, said strain isolating portion having a reduced cross-sectional thickness relative to said main body portion and said sealing flange.

3. A cathode ray tube envelope according to claim 2, wherein said strain isolating portion comprises a frusto-conical band.

4. A cathode ray tube envelope according to claim 2, wherein said strain isolating portion comprises an annular trough-like band.

5. A cathode ray tube envelope comprising a metal shell generally in the shape of a four sided pyramidal frustum, said frustum including a main body portion, a base, and a top, said base having a continuous framing portion, a face plate hermetically sealed to said framing portion, said top having a sealing flange, a glass neck portion hermetically sealed to said sealing flange, and an endless strain isolating portion integral with and forming a connecting portion between said main body portion and said sealing flange, said strain isolating portion having a reduced cross-sectional thickness relative to said main body portion and said sealing flange.

6. A cathode ray tube envelope comprising a tubular metal shell, said shell having a main body portion, a large open end, and a smaller open end, said large open end being adapted to be hermetically closed, said smaller end having a sealing flange adapted to be hermetically sealed to a glass member, said shell including an annular strain isolating portion integral with and forming a connecting portion between said main body portion and said sealing flange, said strain isolating portion having a reduced cross-sectional thickness relative to said main body portion and said sealing flange.

7. A cathode ray tube envelope comprising a metal shell generally in the shape of a four sided right pyramidal frustum, the top of said frustum being open and having a sealing flange, and a strain isolating portion of reduced cross sectional thickness relative to contiguous portions and adjacent to said top of said frustum, said portion of reduced cross section comprising a substantially frusto-conical band, said band having a smaller included angle with reference to a line drawn parallel to the longitudinal axis of said shell than said contiguous portions of said shell.

8. A cathode ray tube envelope comprising a metal shell generally in the shape of a pyramidal frustum, said frustum including a main body portion, a base portion, and a top portion, a face plate hermetically sealed to said base portion, a strain isolating portion including a frusto-conical band adjacent to said top portion, an annular sealing flange extending inwardly from said conical band, and a glass neck portion hermetically sealed to said flange, said frusto-conical band having a reduced cross-sectional thickness relative to said sealing flange and said main body portion, said strain isolating portion being integral with and forming a connecting portion between said main body portion and said annular sealing flange.

9. A cathode ray tube envelope comprising a metal shell generally in the shape of a frustum of a pyramid, said frustum including a main body portion, a base portion, and a top portion, a glass face plate hermetically sealed to said base portion, said face plate having a fluorescent coating thereon, a strain isolating portion including a frusto-conical band adjacent to said top portion, an annular sealing flange extending inwardly from said conical band, and a glass neck portion hermetically sealed to said flange, said frusto-conical band having a reduced cross-sectional thickness relative to said sealing flange and said main body portion, said strain isolating portion being integral with and forming a connecting portion between said main body portion and said annular sealing flange.

References Cited in the file of this patent

UNITED STATES PATENTS

| | | |
|---|---|---|
| 2,132,783 | Goldmark | Oct. 11, 1938 |
| 2,232,098 | Deichman | Feb. 18, 1941 |
| 2,254,090 | Power | Aug. 26, 1941 |
| 2,603,177 | Gardiner | July 15, 1952 |